US009379565B2

(12) United States Patent
Woo

(10) Patent No.: US 9,379,565 B2
(45) Date of Patent: Jun. 28, 2016

(54) BATTERY PACK, METHOD OF CHARGING THE SAME, AND VEHICLE INCLUDING THE SAME

(71) Applicant: Samsung SDI Co. Ltd., Yongin-si, Gyeonggi-do (KR)

(72) Inventor: Seok-Gyun Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 303 days.

(21) Appl. No.: 13/725,960

(22) Filed: Dec. 21, 2012

(65) Prior Publication Data

US 2014/0015495 A1 Jan. 16, 2014

(30) Foreign Application Priority Data

Jul. 10, 2012 (KR) .......................... 10-2012-0075175

(51) Int. Cl.
*H02J 7/00* (2006.01)
(52) U.S. Cl.
CPC .............. *H02J 7/0052* (2013.01); *H02J 7/0029* (2013.01); *H02J 7/0073* (2013.01)
(58) Field of Classification Search
USPC ............. 320/152, 162, 5, 14, 20, 39, 21, 118, 320/131, 160, 150
See application file for complete search history.

(56) References Cited

U.S. PATENT DOCUMENTS

| 5,396,163 | A | * | 3/1995 | Nor et al. ....................... 320/159 |
| 5,500,584 | A | | 3/1996 | Shimomoto |
| 6,414,465 | B1 | * | 7/2002 | Banks et al. .................... 320/118 |
| 6,459,243 | B1 | * | 10/2002 | Cheiky et al. ................... 320/155 |
| 2009/0085527 | A1 | * | 4/2009 | Odaohhara .................... 320/150 |
| 2009/0096428 | A1 | * | 4/2009 | Ko et al. ......................... 320/162 |
| 2011/0057624 | A1 | * | 3/2011 | Rizzo ............................ 320/152 |
| 2012/0086406 | A1 | | 4/2012 | Maeagawa |

FOREIGN PATENT DOCUMENTS

JP 4768090 B2 9/2011
KR 10-0855297 B1 8/2008

OTHER PUBLICATIONS

KIPO Office action dated Nov. 2, 2015, for Korean priority Patent application 10-2012-0075175, (4 pages).

* cited by examiner

*Primary Examiner* — Brian Ngo
(74) *Attorney, Agent, or Firm* — Lewis Roca Rothgerber Christie LLP

(57) ABSTRACT

A battery pack, a method of charging the same, and a vehicle including the same. The battery pack includes: a battery cell for storing electric power; and a Battery Management System (BMS) for controlling charging or discharging the battery cell, wherein, in order to charge the battery cell, the BMS increases a charge current in a first period of time, decreases the charge current in a second period of time, and increases the charge current again in a third period of time.

16 Claims, 6 Drawing Sheets

BATTERY PACK, METHOD OF CHARGING THE SAME, AND VEHICLE INCLUDING THE SAME

CROSS-REFERENCE TO RELATED APPLICATION

This application claims priority to and the benefit of Korean Patent Application No. 10-2012-0075175, filed on Jul. 10, 2012, in the Korean Intellectual Property Office, the disclosure of which is incorporated herein in its entirety by reference.

BACKGROUND

1. Field

One or more embodiments of the present invention relate to a battery pack, a method of charging the same, and a vehicle including the same.

2. Description of the Related Art

Along with the wide use of portable electronic devices, e.g., mobile phones, digital cameras, laptop computers, and so on, batteries for supplying electric power to operate these portable electronic devices have been actively developed. In addition, recently, large-capacity battery systems used for electric vehicles, Uninterruptable Power Supplies (UPSs), and energy storage systems have been briskly developed.

A battery is provided in a battery pack together with a protection circuit for controlling charging and discharging of the battery. Various research into efficiently and safely charging or discharging the battery via the protection circuit has been conducted. In addition, various research for increasing the number of charging cycles and the length of discharging cycles of a battery has been conducted.

SUMMARY

One or more embodiments of the present invention include a battery pack capable of increasing the number of charging cycles and the length of discharging cycles of a battery cell, a method of charging the same, and a vehicle including the same.

Additional aspects will be set forth in part in the description which follows and, in part, will be apparent from the description, or may be learned by practice of the presented embodiments.

According to one or more embodiments of the present invention, a battery pack includes: a battery cell for storing electric power; and a Battery Management System (BMS) for controlling charging or discharging the battery cell. Here, the BMS may be configured to increase a charge current from an initial value during a first period of time, decrease the charge current during a second period of time, and increase again the charge current in a third period of time when charging the battery cell.

A sum of the first period of time, the second period of time, and the third period of time may be equivalent to half of a total charge period of time of the battery cell.

The BMS may be configured to charge the battery cell to a half-charged state during an initial charging period, which includes the first period of time, the second period of time, and the third period of time.

The BMS may be configured to maintain the charge current at a constant level for a fourth period of time, which is between the second period of time and the third period of time.

In an embodiment of the present invention, a sum of the first period of time, the second period of time, the third period of time, and the fourth period of time is equivalent to half of a total charge period of time of the battery cell.

The BMS may be configured to charge the battery cell to a half-charged state during an initial charging period of time, which includes the first period of time, the second period of time, the third period of time, and the fourth period of time.

The BMS may be configured to gradually increase the charge current in the first period of time and the third period of time.

A curve graph of the charge current with time has an inflection point between the first period of time and the third period of time.

The BMS may be configured to increase the charge current from the initial value during the first period of time, then decrease the charge current during the second period of time, and then increase again the charge current in the third period of time when charging the battery cell.

According to another embodiment of the present invention, a vehicle includes: a battery cell; and a controller for controlling charging and discharging of the battery cell, wherein the controller is configured to increase a charge current from an initial value during a first period of time, decrease the charge current during a second period of time, and increase again the charge current in a third period of time when charging the battery cell.

According to another embodiment of the present invention, a method of charging a battery cell may include: determining whether or not charging of the battery cell has started; determining a total charging time period to charge the battery cell to a fully-charged state; determining a first time period, a second time period, and a third time period; and charging the battery cell while controlling a charging current, which includes: gradually increasing the charging current from a first level to a second level during the first time period; gradually decreasing the charging current from the second level to a third level during the second time period; and gradually increasing the charging current from the third level to a fourth level during the third time period.

Half of the total charging time period may include the first time period, the second time period, and the third time period.

Charging the battery cell while controlling a charging current may further include: maintaining the charging current at a fifth level for a final time period, wherein at the end of the final time period, the battery is in the fully charged state, and wherein the total charging period includes the first time period, the second time period, the third time period, and the final time period.

The method may further include calculating a fourth time period, and charging the battery cell while controlling a charging current may further include maintaining the charging current at the third level for the fourth time period, the fourth time period occurring between the second time period and the third time period.

Half of the total charging time period may include the first time period, the second time period, the third time period, and the fourth time period.

The first period of time may occur before the second period of time, and the second period of time may occur before the third period of time.

BRIEF DESCRIPTION OF THE DRAWINGS

These and/or other aspects of the present invention will become more apparent and more readily appreciated from the following description of the embodiments taken in conjunction with the accompanying drawings of which.

DETAILED DESCRIPTION

Figure 1:
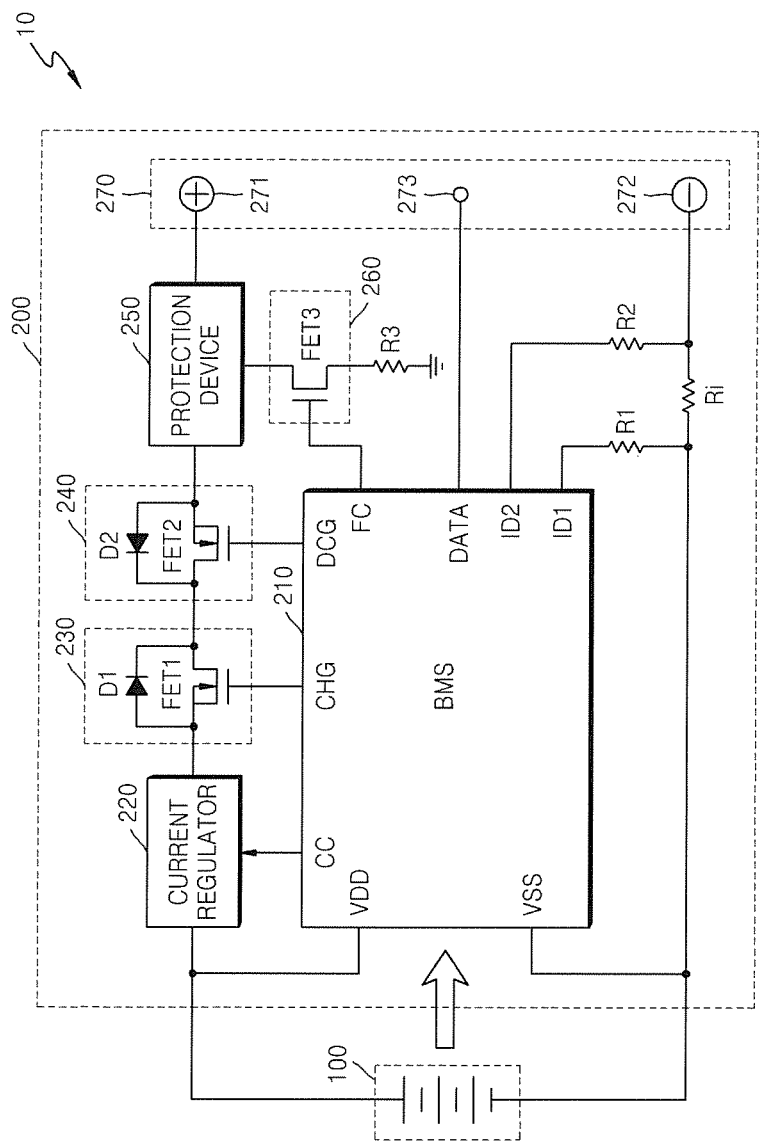
FIG. 1 is a circuit diagram of a battery pack according to an embodiment of the present invention.

While specific embodiments of the present invention will be illustrated in drawings and described in detail herein, a person of ordinary skill in the art would appreciate that various changes or modifications may be made to these described embodiments without departing from the spirit and scope of the present invention. That is, it should be understood that the described embodiments do not limit the inventive concept to a specific disclosed embodiment, but include every modified, equivalent, or replacement embodiment within the spirit and technical scope of the present invention. In the following description, well-known functions or constructions may not be described in detail where they might obscure aspects of the invention with unnecessary detail.

The terminology used in the application is used only to describe specific embodiments and does not have any intention to limit the present invention. An expression in the singular includes an expression in the plural unless they are clearly different from each other in a context. In the application, it should be understood that terms, such as 'include' and 'have', are used to indicate the existence of implemented feature, number, step, operation, element, part, or a combination thereof without excluding in advance the possibility of existence or addition of one or more other features, numbers, steps, operations, elements, parts, or combinations thereof.

Reference will now be made in detail to embodiments of the present invention, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are described below, by referring to the figures, to explain aspects of the present invention.

FIG. 1 is a circuit diagram of a battery pack 10 according to an embodiment of the present invention.

Referring to FIG. 1, the battery pack 10 includes a battery cell 100 and a protection circuit 200. The protection circuit 200 includes a Battery Management System (BMS) 210, a current regulator 220, a charge control switch 230, a discharge control switch 240, a protection device 250, a fuse control switch 260, and a terminal module 270.

The battery cell 100 stores electric power and supplies the stored electric power to an electronic device equipped with the battery pack 10. In addition, when a charger is connected to the battery pack 10, the battery cell 100 may be charged by external electric power. The number of battery cells 100 included in the battery pack 10 may be one or more. A lithium-ion battery may be used as the battery cell 100.

The BMS 210 controls a charging and discharging operation of the battery cell 100 and controls a general operation of the protection circuit 200. The BMS 210 may include a supply voltage terminal VDD, a ground terminal VSS, a current control terminal CC, a charge control terminal CHG, a discharge control terminal DCG, a fuse control terminal FC, a data terminal Data, and current measurement terminals ID1 and ID2.

A supply voltage and a ground voltage are applied to the BMS 210 via the supply voltage terminal VDD and the ground terminal VSS, respectively.

The battery pack 10 may control a charge operation of the battery cell 100 with the charge control switch 230, and may control a discharge operation of the battery cell 100 with the discharge control switch 240. For example, when the battery pack 10 is in an abnormal state during the charge operation, the BMS 210 may output a charge control signal to the charge control switch 230 via the charge control terminal CHG. The charge control switch 230 may then interrupt or limit the charge operation to correct for the abnormal state. In addition, when the battery pack 10 is in an abnormal state during a discharge operation, the BMS 210 may output a discharge control signal to the discharge control switch 240 via the discharge control terminal DCG. The discharge control switch 240 may then interrupt or limit the charge operation to correct for the abnormal state.

In an embodiment of the present invention, the BMS 210 outputs a current control signal to the current regulator 220 via the current control terminal CC. The current regulator 220 may regulate the current (e.g., the magnitude of the current, the charging rate, the discharging rate, and the like) in accordance with the current control signal. In addition, the BMS 210 may output a fuse control signal to the fuse control switch 260 via the fuse control terminal FC. The fuse control switch 260 may operate to blow the fuse in accordance with the fuse control signal.

The BMS 210 may output data via the data terminal Data, and the output data may be delivered to an external device via a communication terminal 273. In addition, the BMS 210 may receive data or a command, which is applied via the communication terminal 273, via the data terminal Data. The data delivered or received may include voltages, currents, temperatures, operating states, commands, and the like.

The BMS 210 may measure a voltage between ends of a current measurement resistor Ri via the current measurement terminals ID1 and ID2. Resistors R1 and R2 may be connected between the current measurement resistor Ri and the current measurement terminals ID1 and ID2, respectively. The BMS 210 may measure a current flowing through the battery cell 100 indirectly according to Ohm's law by using a magnitude of the current measurement resistor Ri (in Ohms) and the voltage measured between the both ends of the current measurement resistor Ri.

The BMS 210 may monitor a State of Charge (SOC) or a State of Discharge (SOD) of the battery cell 100, a temperature, a current flow state inside the battery pack 10, and so on. In addition, when there are two or more battery cells 100, the BMS 210 may measure an intermediate voltage between the battery cells 100. The BMS 210 controls cell balancing of the battery cells 100 and charging and discharging of the battery cells 100 based on the monitoring or measuring result. Although not shown, the BMS 210 may further include terminals for measuring the intermediate voltage and the temperature and monitoring the SOC or SOD and the current flow state.

Although it is described in the present embodiment that the BMS 210 controls all components of the battery pack 10, embodiments of the present invention are not limited thereto. For example, the battery pack 10 may further include an analog front end (not shown) for monitoring a state of the battery cell 100 and controlling an operation of the charge control switch 230 and the discharge control switch 240, and the BMS 210 may control the analog front end.

In an embodiment of the present invention, the current regulator 220 regulates a set current to flow through the battery cell 100 based on the current control signal. The current regulator 220 may regulate the flowing current to be constant or gradually increase or decrease. In addition, the current regulator 220 may regulate an increasing or decreasing speed of the current.

The charge control switch 230 and the discharge control switch 240 are switches for controlling a flow of a charge current and a discharge current. The charge control switch 230 and the discharge control switch 340 may be formed on a path of the flowing current to control the flow of the charge current and the discharge current, respectively.

The charge control switch 230 may include a Field Effect Transistor (FET) FET1 and a parasitic diode D1. The FET FET1 may limit a current flow from a positive terminal 271 to the battery cell 100 or from the battery cell 100 to a negative terminal 272. That is, a flow of the charge current may be cut off using the FET FET1. In the embodiment illustrated in FIG. 1, the FET FET1 is formed to allow the flow of the discharge current through the parasitic diode D1.

The discharge control switch 240 may include another FET FET2 and a parasitic diode D2. The FET FET2 may function to limit a current flow from the negative terminal 272 to the battery cell 100 or from the battery cell 100 to the positive terminal 271. That is, a flow of the charge current may be cut off using the FET FET2. In this embodiment; on the other hand, the FET FET2 is formed to allow the flow of the charge current through the parasitic diode D2. In an embodiment of the present invention, a connection direction of source and drain electrodes of the FET FET2 is opposite to that of the FET FET1.

The charge control switch 230 and the discharge control switch 240, which are switching devices, are not limited to the FET and may include various devices performing the switching function.

The protection device 250 may permanently (or at least until a reset is performed, e.g., replacing a fuse) cut off charging and discharging of the battery pack 10 when the battery pack 10 is in an abnormal state. A fuse may be used as the protection device 250. Once the protection device 250 operates, the battery pack 10 may not be used any more (or may not be used until a reset or maintenance operation is performed). In an embodiment of the present invention, the BMS 210 may control charging and discharging of the battery cell 100 by controlling the charge control switch 230 and the discharge control switch 240 before the protection device 250 operates. However, when an unstable state of the battery pack 10 continues regardless of this control, e.g., when a voltage or temperature of the battery cell 100 is equal to or greater than a pre-set (or suitable or designated) voltage or temperature, the BMS 210 may control the protection device 250 to operate, and the protection device 250 may cut off (e.g., permanently cut off) the charging and discharging of the battery cell 100 by completely breaking the path of the flowing current.

The fuse control switch 260 may perform an on/off operation in response to the fuse control signal output from the fuse control terminal FC of the BMS 210.

A FET FET3 may be used as the fuse control switch 260. In an embodiment of the present invention, when the fuse control switch 260 is placed in an on state in response to the fuse control signal, a current flows from the fuse included in the protection device 250 to ground via the fuse control switch 260 and a resistor R3. Accordingly, the fuse is heated and broken. In this way, the BMS may control the operation of the protection device 250.

The terminal module 270 connects the battery pack 10 to an external device. The external device may be an electronic device, a vehicle, an electric car, or a charger. The terminal module 270 includes the positive terminal 271, the negative terminal 272, the communication terminal 273, etc. Through the positive terminal 271, the charge current is input, and the discharge current is output. Additionally, through the negative terminal 272, the charge current is output, and the discharge current is input. The communication terminal 273 may be connected to the data terminal Data of the BMS 210 and may be used as a path for delivering data and commands between the BMS 210 and the external device.

Figure 2:
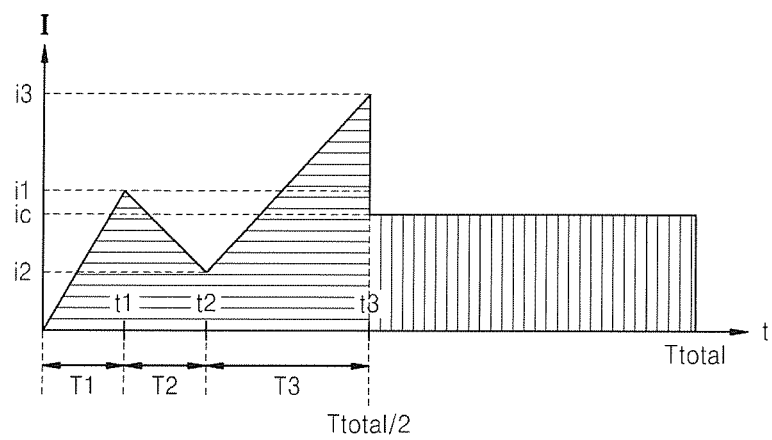
FIG. 2 is a graph showing a charge current waveform of a battery pack, according to an embodiment of the present invention.

FIG. 2 is a graph showing a charge current waveform of the battery pack 10, according to an embodiment of the present invention. In FIG. 2, the horizontal axis indicates time, and the vertical axis indicates a magnitude of current.

Referring to FIG. 2, the BMS 210 controls the charge current waveform when the battery cell 100 is charged. Here, the charge current starts from 0 A at the beginning of charging and increases (e.g., gradually increases) to a pre-set (e.g., a suitable, calculated, or programmed current) first current i1. A duration when the charge current increases from 0 to the first current i1 is a first period of time T1, which is between time 0 and a first time t1.

After the first period of time T1 ends, the BMS 210 may decrease (e.g., gradually decrease) the charge current from the first current i1 to a pre-set second current i2 during a second period of time T2, which is between the first time t1 and a second time t2.

After the second period of time T2 ends, the BMS 210 may increase (e.g., gradually increase) the charge current again, this time from the second current i2 to a pre-set third current i3 during a third period of time T3, which is between the second time t2 and a third time t3.

Finally, in FIG. 2, after the third period of time T3 ends, the BMS 210 keeps charging the battery cell 100 by maintaining the charge current at a final charge current ic.

In the present embodiment, the first period of time T1 in which the charge current initially increases, the second period of time T2 in which the charge current decreases, and the third period of time T3 in which the charge current increases again occur sequentially, as indicated in FIG. 2. That is, according to one or more embodiments of the present invention, the first period of time T1 occurs before the second period of time T2 and the second period of time T2 occurs before the third period of time T3. Thus, the charge current waveform along the time axis may have an inflection point in the second period of time T2.

In the present embodiment, a total charge time is $T_{total}$. The BMS 210 may estimate (or predict) the total charge time $T_{total}$ by measuring a voltage of the battery cell 100. Alternatively, the BMS 210 may estimate the total charge time $T_{total}$ from the SOC of the battery cell 100 and an accumulation of the discharge current. These methods of estimating the total charge time $T_{total}$ are only illustrative, and the total charge time $T_{total}$ may be estimated using various methods.

In addition, in the present embodiment, the BMS 210 adjusts duration of the first period of time T1, the second period of time T2, and the third period of time T3 so that a sum of the first period of time T1, the second period of time T2, and the third period of time T3 (e.g., a time from 0 to t3 in FIG. 2) is half of the total charge time $T_{total}$, i.e., $T_{total}/2$.

The BMS 210 may set values of i1, i2, and i3 so that a charge capacity charged during the time from 0 to t3 is the same as a charge capacity charged with the charge current is during the remaining half time of the total charge time $T_{total}$. In other words, in an embodiment of the present invention, the sum of the capacity charged during the first period of time T1, the second period of time T2, and the third period of time T3 is half of the capacity charged in the total charge time $T_{total}$. In the graph of FIG. 2, a horizontally hashed area is equal to a vertically hashed area.

The BMS 210 may properly adjust (or set) the values t1, t2, and t3 and the values i1, i2, and i3 to satisfy the above-described conditions of time and charge capacity.

Figure 3:
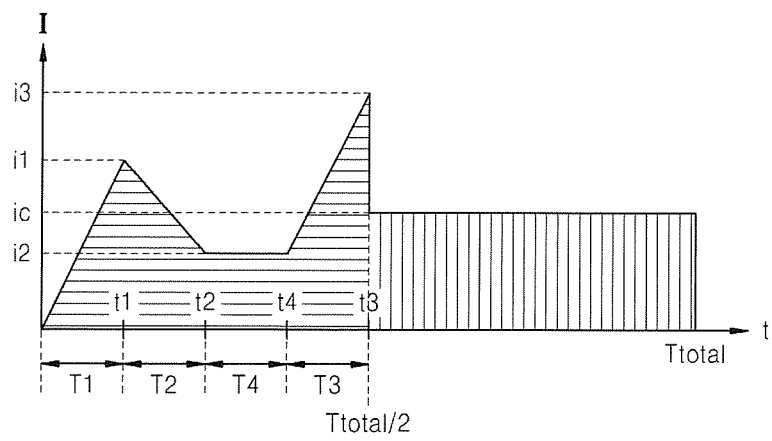
FIG. 3 is a graph showing a charge current waveform of a battery pack, according to another embodiment of the present invention.

FIG. 3 is a graph showing a charge current waveform of the battery pack 10, according to another embodiment of the present invention.

Referring to FIG. 3, the BMS 210 controls the charge current waveform when the battery cell 100 is charged. Here, the charge current starts from 0 A at the beginning of the charging and increases (e.g., gradually increases) to a pre-set (e.g., a suitable, calculated, or programmed) first current i1. A duration in which the charge current increases from 0 to the first current i1 is a first period of time T1, which is between a time 0 and a first time t1.

After the first period of time T1 ends, the BMS 210 may gradually decrease the charge current from the first current i1 to a pre-set second current during a second period of time T2, which is between the first time t1 and a second time t2.

After the second period of time T2 ends, the BMS 210 may maintain the charge current constantly (or substantially constantly) at the second current i2 during a fourth period of time T4, which is between the second time t2 and a fourth time t4.

After the fourth period of time T4 ends, the BMS 210 may gradually increase the charge current again, this time from the second current i2 to a pre-set third current during a third period of time T3, which is between the fourth time t4 and a third time t3.

Finally, after the third period of time T3 ends, the BMS 210 may keep charging the battery cell 100 by changing the charge current at a final current ic.

In the present embodiment, the first period of time T1 in which the charge current initially increases, the second period of time T2 in which the charge current decreases, the fourth period of time T4 in which the charge current is maintained, and the third period of time T3 in which the charge current increases again also occur sequentially (e.g., in the order of T1, T2, T4, then T3), as indicated in FIG. 3. That is, according to one or more embodiments of the present invention, the first period of time T1 occurs before the second period of time T2, the second period of time T2 occurs before the fourth period of time T4, and the fourth period of time T4 occurs before the third period of time T3. Thus, the charge current waveform along the time axis may have an inflection point in the second period of time T2.

In addition, like in the embodiment discussed in connection with FIG. 2, the BMS 210 adjusts durations of the first period of time T1, the second period of time T2, the fourth period of time T4, and the third period of time T3 so that a sum of the first period of time T1, the second period of time T2, the fourth period of time T4, and the third period of time T3 is half of the total charge time $T_{total}$, i.e., $T_{total}/2$. In addition, the BMS 210 sets values of i1, i2, and i3 so that a charge capacity charged during the time from 0 to t3 is the same as a charge capacity charged with the charge current ic during the remaining half period of time.

Figure 4:
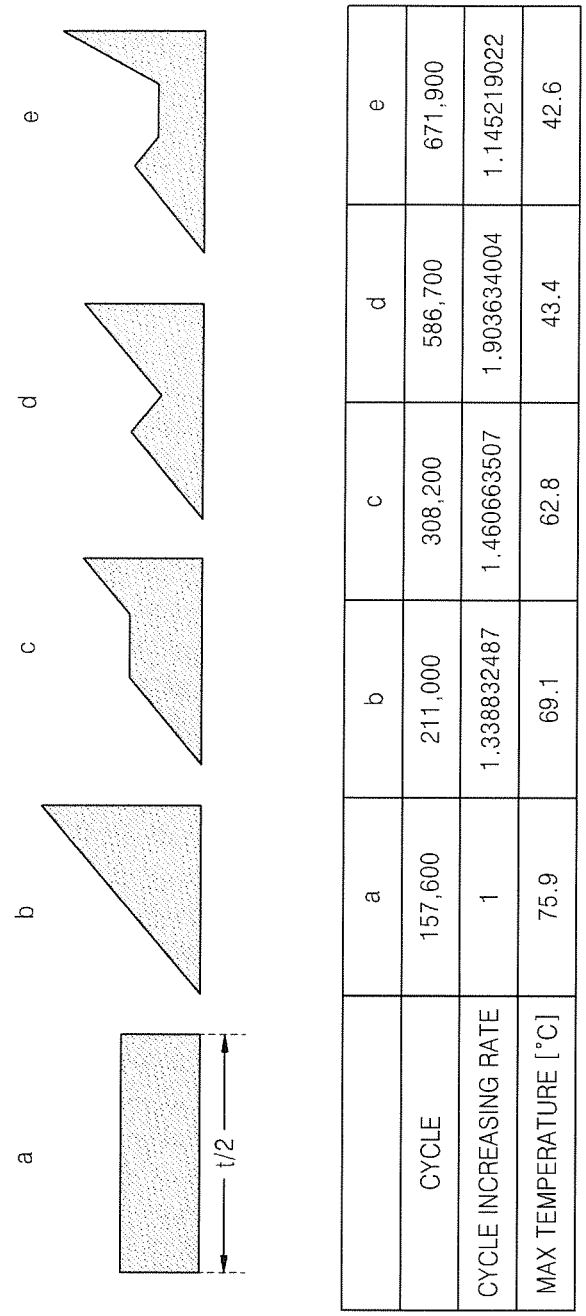
FIG. 4 is a table showing charging and discharging cycles corresponding to charge current waveforms, including those according to an embodiment of the present invention.

FIG. 4 is a table showing charging and discharging cycles corresponding to charge current waveforms, including those according to an embodiment of the present invention.

Referring to FIG. 4, elements a to e are schematic drawings of charge current waveforms. The waveform a shows a case where charging is performed with a constant current during the charging period of time $T_{total}/2$, and the waveform b shows a case where charging is performed by continuously increasing a charge current during the period of time $T_{total}/2$. The waveform c shows, during the period of time $T_{total}/2$, a case where charging is performed by increasing a charge current, maintaining the charge current for a predetermined (e.g., set or suitable) time, and increasing the charge current again. The waveform d is a charge current waveform according to the embodiment of FIG. 2, and the waveform e is a charge current waveform according to the embodiment of FIG. 3. For all of the waveforms a to e, the remaining charging, after the period of time $T_{total}/2$, is performed by maintaining the charge current at the final current ic.

For FIG. 4, a "CYCLE" is defined as an operation of charging and discharging the battery cell 100, where the charging is performed according to the corresponding waveform. The number of cycles presented in FIG. 4 represents a number of cycles over a "lifetime" of the battery cell 100 charged according to the corresponding charging waveform. A "CYCLE INCREASING RATE" is defined as the "lifetime" number of cycles of the battery cell 100 charged according to the corresponding waveform divided by the "lifetime" number of cycles of the battery cell 100 charged according to the previous waveform on the chart, i.e., b/a; c/b; d/c, and e/d (except for waveform a which relates to itself). As can be seen in FIG. 4, the "lifetime" number of cycles for the battery cells 100 charged according to waveforms a to e, respectively, increases when progressing through the chart from the waveform a to the waveform e. For example, when the battery cell 100 is charged using the waveform d, the number of charging and discharging cycles of the battery cell 100 is 586,700, which is greater by about 3.7 times than the waveform a by which the number of charging and discharging cycles of the battery cell 100 is 157,600. Additionally, when the battery cell 100 is charged using the waveform e, the number of charging and discharging cycles of the battery cell 100 is 671,900, which is greater by about 4.3 times than the waveform a.

In addition, while a maximum temperature of the battery cell 100 may be, for example, about 75.9° C. when the battery cell 100 is charged using the waveform a, the maximum temperature of the battery cell 100 may be about 43.4° C. when the battery cell 100 is charged using the waveform d, and the maximum temperature of the battery cell 100 may be about 42.6° C. when the battery cell 100 is charged using the waveform e. That is, when the battery cell 100 is charged using the waveform d or e, heating of the battery cell 100 may also be reduced by more than 40%.

According to FIG. 4, it may be determined that a waveform during the period of time $T_{total}/2$ corresponding to an initial half of the total charge time $T_{total}$ that is taken to fully charge the battery cell 100 directly affects the charging and discharging cycle of the battery cell 100.

In particular, rather than a case where the charge current gradually increases, in a case where the charge current increases, decreases for a set (or predetermined) time, and increases again, it may be concluded that the charging and discharging cycle of the battery cell 100 apparently increases. That is, a "lifetime" number of cycles increases.

Figure 5:
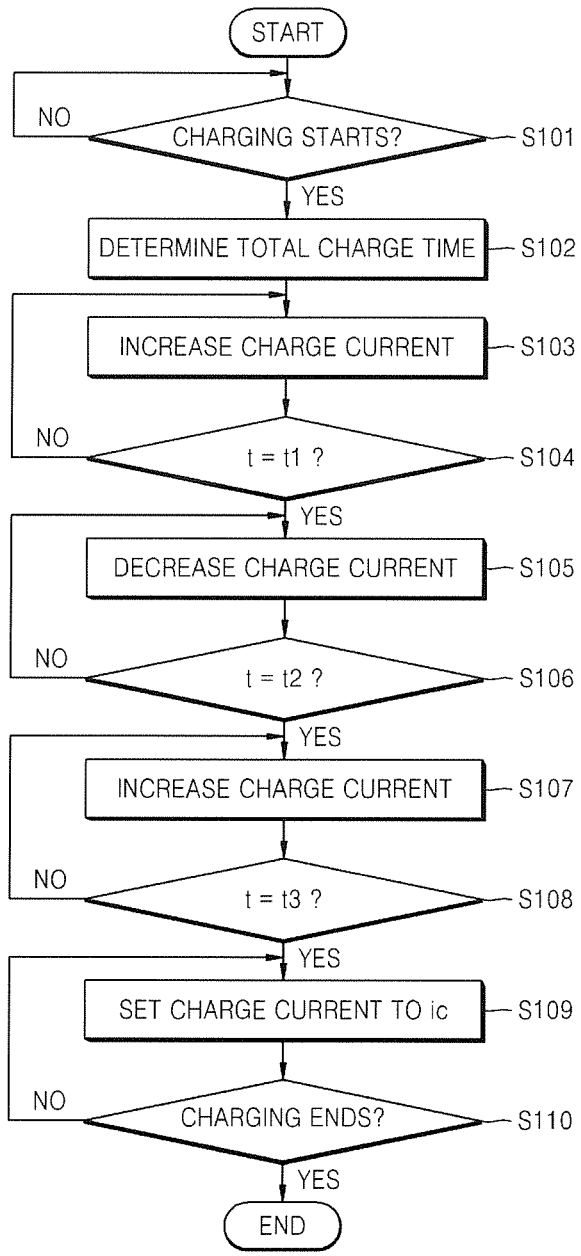
FIG. 5 is a flowchart illustrating a method of charging a battery pack, according to an embodiment of the present invention.

FIG. 5 is a flowchart illustrating a method of charging the battery pack 10, according to an embodiment of the present invention.

Referring to FIG. 5, the BMS 210 determines in operation S101 whether or not charging of the battery cell 100 has started. When the BMS 210 determines that charging of the battery cell 100 starts, the BMS 210 determines a total charging time $T_{total}$ to fully charge the battery cell 100, which may be according to a result of monitoring the battery cell 100 in operation S102. The BMS 210 may decide durations of the first period of time T1, the second period of time T2, and the third period of time T3 and may decide magnitudes of currents i1, i2, and i3 according to the determined total charging time $T_{total}$.

In operation S103, the BMS 210 may start the charging operation by increasing (e.g., gradually increasing) a charge current after deciding the above conditions. In operation S104, the BMS 210 may determine whether or not a charge time is t1. That is, the BMS 210 may determine whether or not the first period of time T1 has ended. If the charge time is not t1, the BMS 210 proceeds back to operation S103 to keep charging the battery cell 100 during the first period of time T1. That is, the BMS 210 may gradually increase the charge current from 0 A to the first current i1 during the first period of time T1.

When the charge time is t1, the BMS 210 may charge the battery cell 100 by decreasing (e.g., gradually decreasing) the charge current in operation S106. In operation S106, the BMS 210 may determine whether or not the charge time is t2. That is, the BMS 210 may determine whether or not the second period of time T2 has ended. If the charge time is not t2, the BMS 210 proceeds back to operation S105 to keep charging the battery cell 100 during the second period of time T2. That is, the BMS 210 may gradually decrease the charging current from the first current i1 to the second current i2 during the second period of time T2.

When the charge time is t2, the BMS 210 may charge the battery cell 100 by increasing (e.g., gradually increasing) the charge current in operation S107. In operation S108, the BMS 210 may determine whether or not the charge time is t3. That is, the BMS 210 may determine whether or not the third period of time T3 has ended. If the charge time is not t3, the BMS 210 may proceed back to operation S107 to keep charging the battery cell 100 during the third period of time T3. That is, the BMS 210 may gradually increase the charging current from the second current i2 to the third current i3 during the third period of time T3.

When the charge time is t3, the BMS 210 may charge the battery cell 100 by setting the charge current to the final current is in operation S109. That is, the BMS 210 may determine that half of the total charging time $T_{total}$ has elapsed and charge the battery cell 100 for the remaining half of the total charging time $T_{total}$.

In operation S110, the BMS 210 determines whether or not the battery cell 100 is fully charged, and if the battery cell 100 is not fully charged, the BMS 210 proceeds back to operation S109 to keep charging the battery cell 100.

Figure 6:
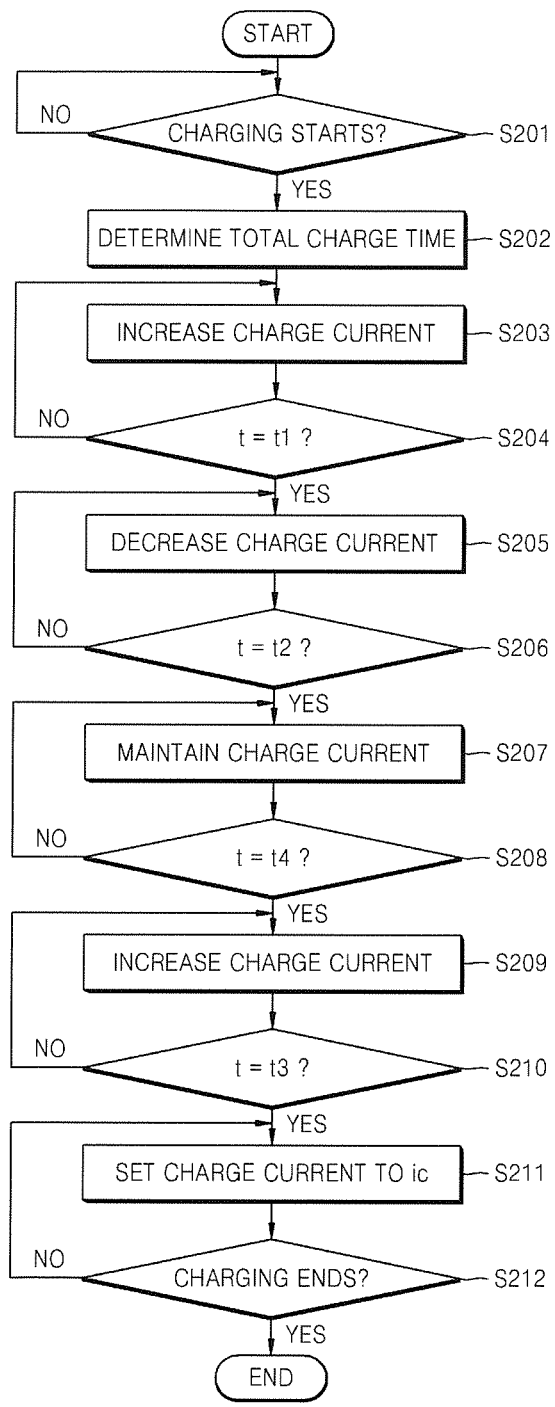
FIG. 6 is a flowchart illustrating a method of charging a battery pack, according to another embodiment of the present invention.

FIG. 6 is a flowchart illustrating a method of charging the battery pack 10, according to another embodiment of the present invention. In the present embodiment, a description is made by focusing on differences from the embodiment of FIG. 5. As such, some aspects of the present embodiment are given by way of reference to the previous embodiments. For example, the descriptions of operations S201, S202, S203, S204, S205, S209, S210, S211, and S212 are given by way of reference to the operations S101, S102, S103, S104, S105, S107, S108, S109, and S110, respectively.

Referring to FIG. 6, when the BMS 210 determines in operation S206 that the charge time is t2, the BMS 210 may charge the battery cell 100 by constantly maintaining the charge current in operation S207. In operation S208, the BMS 210 may determine whether or not the charge time is t4. That is, the BMS 210 may determine whether or not the fourth period of time T4 ends. If the charge time is not t4, the BMS 210 may proceed back to operation S207 to keep charging the battery cell 100 during the fourth period of time T4. That is, the BMS 210 may maintain the charging current at the second current i2 during the fourth period of time T4.

When it is determined that the fourth period of time T4 has ended, the BMS 210 may charge the battery cell 100 during the third period of time T3 according to the operations S209 and S210. Thereafter, the operations S211 to S212 are performed. As mentioned above, operations S209 through S212 are similar to the operations S107 through S110 of FIG. 5

Figure 7:
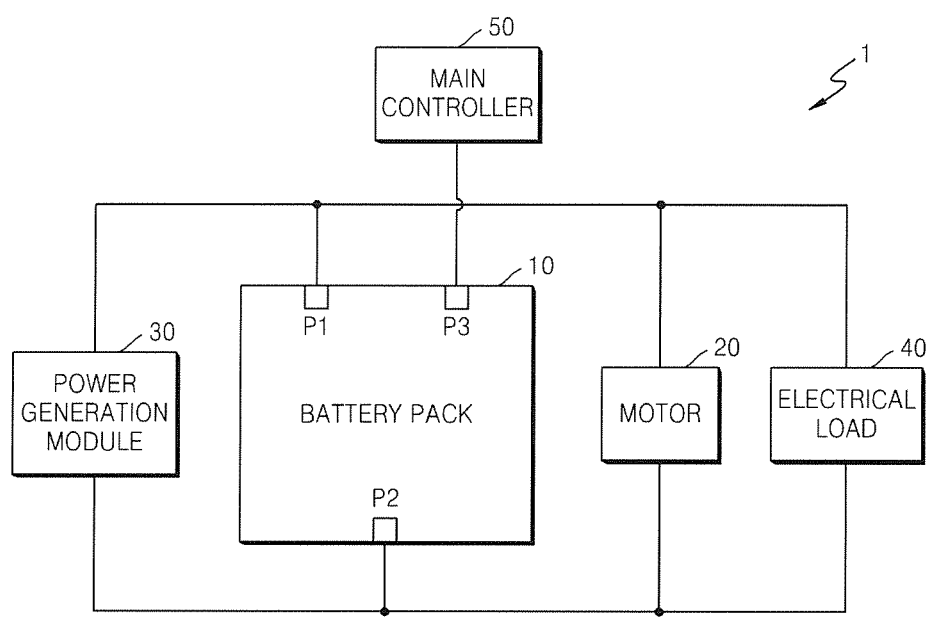
FIG. 7 is a block diagram illustrating an electrical configuration of a vehicle, according to an embodiment of the present invention.

FIG. 7 is a block diagram illustrating an electrical configuration of a vehicle 1, according to an embodiment of the present invention.

Referring to FIG. 7, the vehicle 1 includes the battery pack 10, a motor 20, a power generation module 30, an electrical load 40, and a main controller 50.

The battery pack 10 may be that of FIG. 1. The battery pack 10 receives a current generated by the power generation module 30, stores electrical energy, and supplies a driving current to the motor 20. In addition, the battery pack 10 may supply the stored electrical power to a control unit, such as the main controller 50, as an operational power source and may supply the stored electrical power to the electrical load 40.

The battery pack 10 may be applied to a power supply for starting an engine in an Idle Stop & Go (ISG) system having an ISG function for improving gas mileage. In the ISG system, the battery pack 10 may be repeatedly charged and discharged according to a frequent repetition of stopping and restarting of the engine.

A lead battery applied to existing ISG systems may have a life span that is reduced, and its charging and discharging characteristics may decrease when charging and discharging are frequently repeated. For example, the repetition of charging and discharging may cause a decrease in a charge capacity, resulting in deterioration in starting of the engine, and thus, a replacement cycle of the lead battery is shortened.

However, according to the present embodiment, the battery pack 10 maintains the charging and discharging characteristics relatively constantly in comparison to the lead battery and may be suitably used with a lithium-ion battery having less temporal deterioration in the ISG system in which stopping and starting of an engine are repeated. In addition, since the battery pack 10 may have less weight than a lead battery having the same charge capacity, a gas mileage improvement effect may be expected, and since the battery pack 10 may charge the same charge capacity with smaller volume than that of a lead battery, an installation space may be saved.

According to an embodiment of the present invention, the motor 20 may be a starter motor. In this case, the motor 20 operates when the vehicle 1 is started and provides an initial rotation power for rotating a driving axis of an engine (not shown). For example, the motor 20 may receive electrical power through first and second terminals P1 and P2 of the battery pack 10 and operate the engine by rotating the driving axis when the engine is started or after an idle stop of the engine.

According to another embodiment of the present invention, the motor 20 may be a driving motor of the vehicle 1. In this case, the vehicle 1 may be electrically driven only or may be a hybrid-type vehicle using both electricity and another energy source.

The electrical load 40 may consume the electrical power stored in the battery pack 10. The electrical load 40 may be various electronic devices, e.g., a navigation system, an audio device, a lighting system, a car black box, and an anti-theft device. The number and types of components forming the electrical load 40 may vary according to an embodiment of the vehicle 1.

The main controller 50 may control a general operation of the vehicle 1 equipped with the battery pack 10. The main controller 50 may exchange various types of data and control signals with the battery pack 10 by being connected to the battery pack 10 through a third terminal P3. The main controller 50 may monitor a state of the battery pack 10, and control an operation of the battery pack 10.

As described above, according to one or more of the above embodiments of the present invention, a battery pack capable of increasing the number of charging cycles and the length of discharging cycles of a battery cell, a method of charging the same, and a vehicle including the same may be provided.

Specific embodiments described in the present invention are exemplary embodiments and do not limit the scope of the present invention. For conciseness of the specification, disclosure of certain electronic configurations, control systems, software, and other functional aspects of the systems have been omitted. In addition, connections or connection members of lines between components shown in the drawings illustrate functional connections and/or physical or circuit connections, and the connections or connection members may be represented by replaceable or additional various functional connections, physical connections, or circuit connections in an actual apparatus.

The use of all illustrations or illustrative terms (for example, and so forth, etc.) in the present invention is simply to describe embodiments of the present invention in detail, and the scope of the present invention is not limited to the illustrations or illustrative terms unless they are limited by claims. In addition, it will be understood by those of ordinary skill in the art that various modifications, combinations, and changes can be formed according to design conditions and factors within the scope of the attached claims or their equivalents.

What is claimed is:

1. A battery pack comprising:
    a battery cell for storing electric power; and
    a Battery Management System (BMS) for controlling charging or discharging the battery cell,
    wherein the BMS is configured to increase a charge current from an initial value to a first level during a first period of time, decrease the charge current to a second level during a second period of time, increase again the charge current to a third level in a third period of time when charging the battery cell, and maintain the charge current at a fourth level after the third period of time, the third level being higher than the first level and the BMS being configured to control the charge current to be positive from the second period of time until the third period of time, the fourth level being higher than the second level and lower than the third level.

2. The battery pack of claim 1, wherein a sum of the first period of time, the second period of time, and the third period of time is equivalent to half of a total charge period of time of the battery cell.

3. The battery pack of claim 2, wherein the BMS is configured to charge the battery cell to a half-charged state during an initial charging period comprising the first period of time, the second period of time, and the third period of time.

4. The battery pack of claim 1, wherein the BMS is configured to maintain the charge current at a constant level for a fourth period of time, which is between the second period of time and the third period of time.

5. The battery pack of claim 4, wherein a sum of the first period of time, the second period of time, the third period of time, and the fourth period of time is equivalent to half of a total charge period of time of the battery cell.

6. The battery pack of claim 5, wherein the BMS is configured to charge the battery cell to a half-charged state during an initial charging period of time comprising the first period of time, the second period of time, the third period of time, and the fourth period of time.

7. The battery pack of claim 1, wherein the BMS is configured to gradually increase the charge current in the first period of time and the third period of time.

8. The battery pack of claim 1, wherein a curve graph of the charge current with time has an inflection point between the first period of time and the third period of time.

9. The battery pack of claim 1,
    wherein the BMS is configured to increase the charge current from the initial value during the first period of time, then decrease the charge current during the second period of time, and then increase again the charge current in the third period of time when charging the battery cell.

10. A vehicle comprising:
    a battery cell; and
    a controller for controlling charging and discharging of the battery cell,
    wherein the controller is configured to increase a charge current from an initial value to a first level during a first period of time, decrease the charge current to a second level during a second period of time, increase again the charge current to a third level in a third period of time when charging the battery cell, and maintain the charge current at a fourth level after the third period of time, the third level being higher than the first level and the controller being configured to control the charge current to be positive from the second period of time until the third period of time, the fourth level being higher than the second level and lower than the third level.

11. A method of charging a battery cell comprising:
    determining whether or not charging of the battery cell has started;
    determining a total charging time period to charge the battery cell to a fully-charged state;
    determining a first time period, a second time period, and a third time period; and
    charging the battery cell while controlling, by a battery management system coupled to the battery cell, a charging current, which comprises:
        gradually increasing the charging current from a first level to a second level during the first time period;
        gradually decreasing the charging current from the second level to a third level during the second time period;
        gradually increasing the charging current from the third level to a fourth level during the third time period, the fourth level being higher than the second level;
        maintaining the charging current at a fifth level after the third time period, the fifth level being higher than the third level and lower than the fourth level; and controlling the charging current to be positive from the second time period until the third time period.

12. The method of claim 11, wherein half of the total charging time period comprises the first time period, the second time period, and the third time period.

13. The method of claim 12, wherein charging the battery cell while controlling a charging current further comprises:
   maintaining the charging current at a fifth level for a final time period,
   wherein at the end of the final time period, the battery cell is in the fully charged state, and
   wherein the total charging period comprises the first time period, the second time period, the third time period, and the final time period.

14. The method of claim 11, further comprising calculating a fourth time period,
   wherein charging the battery cell while controlling a charging current further comprises maintaining the charging current at the third level for the fourth time period, the fourth time period occurring between the second time period and the third time period.

15. The method of claim 14, wherein half of the total charging time period comprises the first time period, the second time period, the third time period, and the fourth time period.

16. The method of claim 11,
   wherein the first time period occurs before the second time period, and
   wherein the second time period occurs before the third time period.

* * * * *